United States Patent [19]

Vithayathil

[11] Patent Number: 5,012,148
[45] Date of Patent: Apr. 30, 1991

[54] AC MACHINE SYSTEM WITH INDUCED DC FIELD

[76] Inventor: Joseph Vithayathil, 3217 Johnson Ave., Apt. 2, San Luis Obispo, Calif. 93401

[21] Appl. No.: 407,211

[22] Filed: Sep. 14, 1989

[51] Int. Cl.$^5$ .............................................. H02K 19/02
[52] U.S. Cl. ...................................... 310/165; 310/162
[58] Field of Search ....................... 310/49 R, 680, 162, 310/163, 164, 165, 166, 168, 171, 261, 264

[56] References Cited

U.S. PATENT DOCUMENTS

| | | | |
|---|---|---|---|
| 4,246,506 | 1/1981 | Vartanian et al. | 310/165 |
| 4,289,989 | 9/1981 | Schibline | 310/165 |
| 4,628,245 | 12/1986 | Quayle | 310/165 |
| 4,835,431 | 5/1989 | Lindgren | 310/165 |

Primary Examiner—Steven L. Stephan
Assistant Examiner—Judson H. Jones

[57] ABSTRACT

An AC machine system, in which the machine has an auxiliary rotating magnetic field, in addition to the main rotating field, with different speeds of rotation. The auxiliary field serves to induce AC voltages in the rotor windings, even when the machine is rotating at the synchronous speed of the main field. The induced AC is rectified, by having a rectifier circuit on the rotor, and provides DC excitation, to create fixed magnetic poles on the rotor. Thereby the machine functions at the synchronous speed of the main field, without the need for a DC exciting source, external to the rotor circuit. The presence of AC current components in the rotor coils, enable torque production at non-synchronous speeds also. The combination of main and auxiliary rotating fields can be implemented in several ways, such as a stator supply having more than one frequency components, or components of opposite sequence. It can also be done by appropriate design of the stator circuit.

14 Claims, 1 Drawing Sheet

AC MACHINE SYSTEM WITH INDUCED DC FIELD

BACKGROUND OF THE INVENTION

This invention relates to an induction type AC machine. The machine can operate in the motoring or generating modes, similar to conventional AC motors of the induction or synchronous types. Single or polyphase machines are possible. For purposes of clarity, this description of the background art in relation to the invention, will generally keep in view the motoring modes of conventional 3 phase induction and synchronous types of motors.

In conventional 3 phase motors, a sinusoidal 3 phase AC input to the stator windings create a rotating magnetic field in the air gap. Ideally, this field has a sinusoidal spatial distribution, at any instant of time. It rotates at the speed, determined by the AC input frequency and the number of motor poles, called the synchronous speed.

In the induction motor, the rotor speed is less than the synchronous speed. The speed difference, known as the slip speed, is the relative speed necessary to induce AC currents of slip frequency in the rotor conductors, whereby the motor develops torque. The slip speed, and therefore the motor speed, change with variations in load torque. The present invention achieves operation at a synchronous speed, independent of load variations, while still utilizing the principle of induced rotor currents, by means of a technique to be described subsequently.

The conventional synchronous motor always runs at the synchronous speed, independent of load torque variations. This happens, because the rotor has fixed magnetic poles, which lock with the stator rotating field. The fixed poles of the rotor are implemented, either by the use of permanent magnets, or magnetizing DC current in a field circuit on the rotor. Permanent magnet synchronous machines have no easy way for control of the rotor flux. DC excited synchronous machine requires a DC source, external to the rotor circuit, to provide the field current. Slip rings and brushes are necessary, to feed the field current to the rotor, if the DC exciting current is to be drawn from stationary DC terminals. "Brushless excitation" systems are also in use, wherein a coupled exciter machine is used, which has stationary DC poles and rotating coils in which AC is induced. These are rectified and made available for feeding the field terminals of the synchronous machine without the need for slip rings and brushes. Every DC excited synchronous machine requires a DC source, which is external to the rotor circuit. In the present invention, the DC excitation is achieved by rectification of induced AC in the rotor circuit itself. The motor therefore rotates at a synchronous speed, as defined subsequently, independent of load variations.

Since a slip speed is necessary to induce voltages in the rotor, there is an apparent contradiction in the above statement, that the motor rotates at synchronous speed and still has induced currents in its rotor circuit, in the present invention. This contradiction is resolved by the fact that in this invention, the stator rotating field actually has two rotating components, which rotate at different speeds. Of these, the "main field", which ordinarily is the dominant component, has the same motor function in this invention, as the field in a conventional synchronous motor. The other component, which will be labelled here as the "auxiliary field", serves to induce currents in the rotor, even when the motor is rotating at the synchronous speed of the main field. The rotor also has a rectifier circuit, for converting the induced currents into DC. The detailed description of the invention, which follows, further explains this.

DETAILED DESCRIPTION OF THE INVENTION

Figure 1:
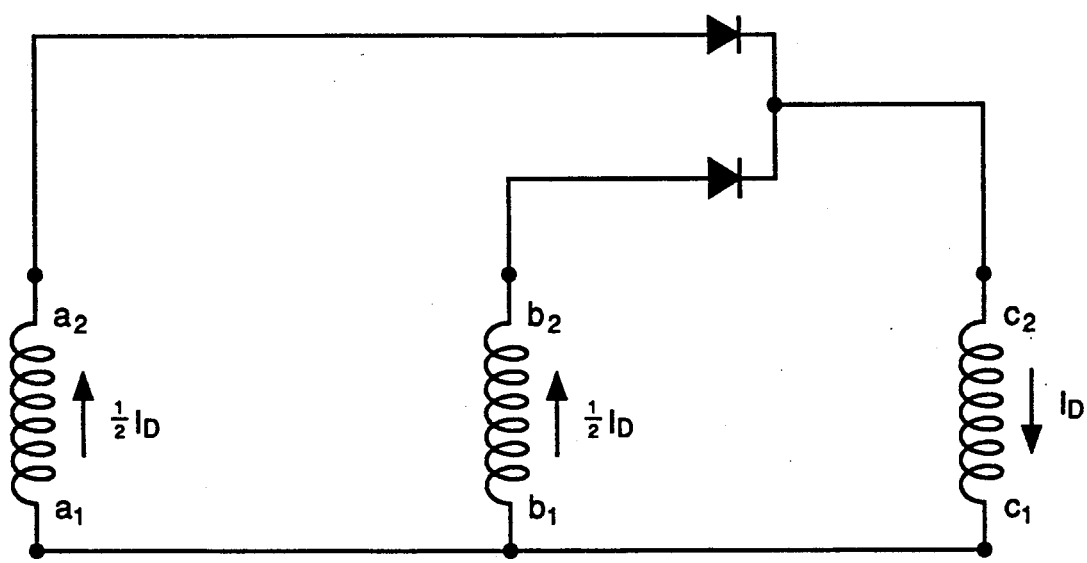
FIG. 1 shows a rotor circuit, wherein the DC excitation is implemented by the same coils in which AC is induced.

Unlike the conventional types of induction and synchronous motors, the present invention has two distinct components in the rotating field system. The main field component functions similar to the rotating field in a conventional motor. Its speed is defined herein, as the synchronous speed of the motor. The auxiliary field component differs in speed from the synchronous speed of the main field. The auxiliary field may be a single rotating field, or itself may have several components, each of which has a different speed. In this description, an auxiliary field having only a single component will be generally be assumed, in the interests of clarity. Such a limitation does not exist, in the application of this invention. The auxiliary field serves to induce AC voltages in the rotor conductors, even when the rotor rotates at the defined synchronous speed, in a manner similar to what occurs in a conventional induction motor. The rotor in this invention has also a rectifier circuit, which converts induced AC into DC, thereby providing a DC field current, enabling the motor to run at synchronous speed as defined. Like conventional AC machines, the machine in this invention can be a motor or a generator. It is also possible to change the operating mode of the same machine between motoring and generating modes, as in conventional drive systems using regenerative braking. Drive systems are visualized as the major application area of this invention, and therefore the motoring mode will generally be kept in view, in this description.

Three general schemes are described here, to illustrate some of the practical ways in which the combination of main and auxiliary fields can be implemented in this invention. These are primarily for illustration of the operation of the invention and do not exclude alternative ways of implementation.

(i) The use of a power supply to the motor, which has more than one frequency component.
(ii) The use of unbalance in the motor power supply, or in the motor stator circuit.
(iii) Use of motor phase winding, with a magnetic field distribution having a significant spatial harmonic content.

Power supply with more than one frequency component:

This technique is particularly convenient, in static inverter fed drive systems. The output of the inverter must have more than one AC frequency component. One of these frequencies should correspond to the synchronous speed of the main field. The other frequency or frequencies serve to produce the auxiliary field.

In many types of static inverters in present day use, the output waveform departs considerably from the ideal sine wave. This means the presence of harmonic frequency components of significant level, in addition to the fundamental sine wave. Inverters with near sinusoidal output waveform have greater circuit complexity and are more costly. The presence of significant harmonic content is generally considered as a disadvantage and a price to pay, for reduced cost and circuit complexity. In this invention, this limitation of the inverter is turned into an advantage, by using the harmonic content to produce the auxiliary rotating field.

A static inverter system can also be designed to provide an output AC, which is a combination of two or more AC, of desired frequencies and magnitudes. For example, there are inverters, whose internal switching is controlled in such a way, that its output waveform is a close reproduction of a reference waveform, provided in the control circuit. In such a case, the reference waveform can be the resultant of the combination of the required AC waveforms.

Inverters belonging to the voltage source catagory, as well as those belonging to the current regulated catagory, are presently used, for drive applications. The former type feeds the motor with a regulated voltage, while the latter provides a regulated current. The aforesaid statements apply to both types of inverters. Also, it is possible to design the motor with two sets of windings. The inverter system may then supply one set of windings with one frequency for the main field and the other set for the auxiliary field. Pulsed input to one for stepping operation is also possible.

Inverter drives, in present day use, often incorporate provision for the control of any one or more of (i) torque, (ii) speed (iii)position (iv) field orientation. In some applications, the internal switching within the inverter system is controlled by signals derived from the rotor speed or rotor position, as in vector control and "brushless DC motors". All such techniques can be used in this invention also.

The use of unbalance in the motor power supply or in the motor stator circuits:

An unbalanced system of 3 phase AC has, as its components, balanced symmetrical components, of opposite phase sequence. The direction of rotation of the associated magnetic fields are opposite, for the positive and negative sequence components. In applying the present invention using this technique, an unbalanced AC is used to feed the motor. The dominant symmetrical component will, ordinarily, provide the main field and the reverse symmetrical component will serve to provide the auxiliary field. Every 3 phase supply, which is not balanced, is in fact an unbalanced system. Therefore, there is a very wide range of practical possibilities, for applying this invention, using unbalanced supplies.

It is also possible to create the required unbalance in the stator circuit. The stator windings of the three phases can be designed with unbalance in several possible ways. The stator circuit can have two sections, each section being supplied with opposite phase sequence.

It may also be stated here, that this invention is applicable to single phase motors also. The single phase alternating field, in this type of motors, is equivalent to the resultant of two rotating magnetic fields, rotating with equal speed in opposite directions. The desired direction of rotation of the rotor is achieved, in conventional motors, by the starting arrangement. In conventional motors, the unmavoidable presence of the reverse rotating field is considered a disadvantage. Use of this invention turns it into an advantage, by using the reverse rotating field component to create the auxiliary field, enabling motor operation at synchronous speed in the forward direction.

Use of motor phase winding with a magnetic field distribution having significant spatial harmonic content:

Identical stator windings on each stator phase can be designed to produce more than one rotating field component, when fed by a balanced sinusoidal supply. This statement will be evident, when it is remembered, that in conventional AC machines, each phase winding has coils distributed in such a way, that the resulting spatial magneto motive force (mmf) distribution when it carries current, is as close as possible, to a sine wave. If the number of coils for a phase winding is reduced, thereby resulting in an insufficient distribution, there will be saving in cost; but the resulting spatial field distribution will have a greater content of spatial harmonics. Some of these spatial harmonics will produce rotating magnetic fields, which rotate at different speeds from the fundamental sinusoidal component. In the application of this invention, the fundamental spatial component can be used as the main field and the rest as the auxiliary field. This manner of utilizing the invention will therefore result in a simpler and more economical motor construction.

ROTOR CONSTRUCTION

In this invention, the rotor of the machine will have windings, but no slip rings and brushes. The number of rotor phases may, or may not be, the same as the number of stator phases. The rotor circuit will not require any electrical connections with any circuit external to it. The rotor will also have rectifying circuit for conversion of induced AC into DC. The DC current will provide the excitation to create fixed magnetic poles on the rotor. This can be done with the same rotor coils, in which the AC is induced. It can also be done using a separate magnetizing coil circuit. Any one of these methods, or their combination, can be used in the same machine.

To illustrate a scheme, which has no separate magnetizing circuit section, reference may be made to FIG. 1. This circuit has three phase coils, in which AC voltages are induced. They are labelled $a_1a_2$, $b_1b_2$, $c_1c_2$. The diode rectifying arrangement causes a DC current, labelled as $I_D$ to flow in the c phase from terminal $c_2$ to terminal $c_1$. The currents in the other phases will be each $\frac{1}{2}I_D$ in magnitude and in directions $a_1$ to $a_2$ and $b_1$ to $b_2$. Conventional analysis, of the mmf distribution due to three phase coils, show that these relative magnitudes and directions of current, result in a mmf, centered along the c phase. The diodes can also be connected with their polarities reversed, in which case the directions of current will reverse and the polarities of the resulting magnetic poles on the rotor will also be reversed.

Figure 2:
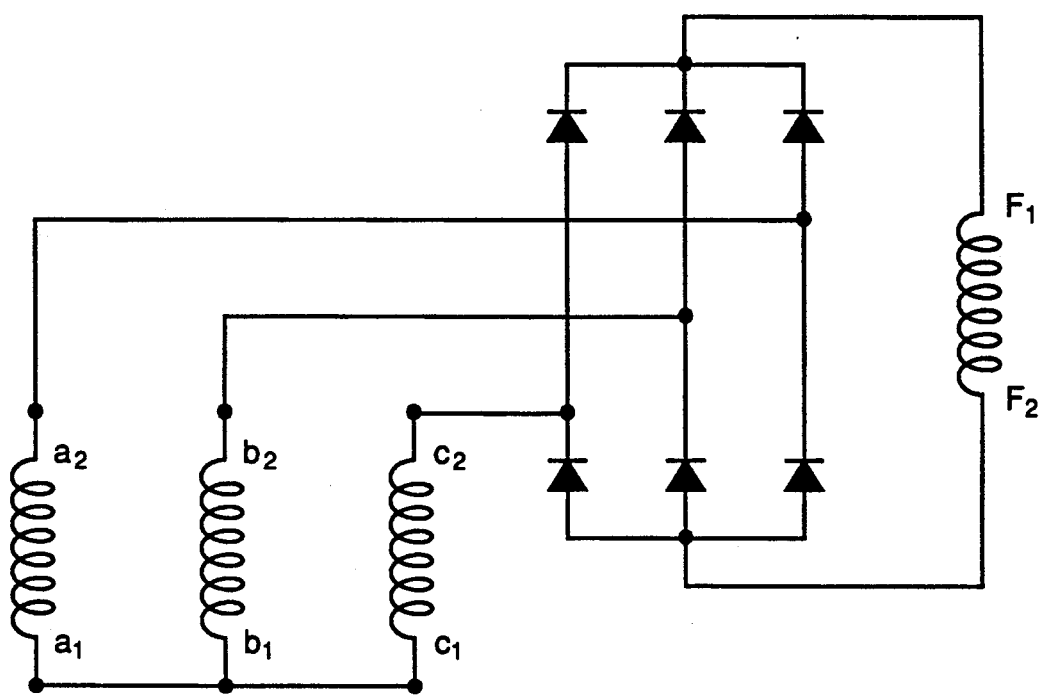
FIG. 2 shows a rotor circuit, which has a DC field circuit, in addition to the AC coils.

A circuit scheme, which has a separate DC magnetizing coil circuit section, is shown in FIG. 2. In this, the phase windings of the rotor are labelled $a_1a_2$, $b_1b_2$, $c_1c_2$. The induced AC in these windings is rectified, by the diodes, which are connected in bridge configuration. The rectified DC current flows in the magnetizing coil $F_1F_2$. In this scheme, the phase coils carry AC currents without DC component.

The aforesaid illustrative schemes show that the phase coils can have AC currents or AC current components. The phase coil currents in FIG. 1, while having DC components, also have AC components. From this it follows, that the machine in this invention will develop torque, at non-synchronous speeds, in a manner similar to the conventional induction motor. Conventional induction motors do not develop torque at synchronous speeds. In this invention, the machine develops torque at synchronous speeds, in a manner similar to the conventional synchronous motor. But the conventional synchronous machine, in itself, has no torque at nonsynchronous speeds.

The circuit schemes described here, are primarily for illustration. Evidently, several other circuit schemes are possible to provide the DC current from induced AC, to create fixed poles on the rotor.

I claim:

1. An AC machine system with induced DC field comprising:

an AC machine, whose rotor has coils and rectifying elements, to provide DC excitation, to create DC excited magnetic poles on the rotor, to enable operation at the synchronous speed, as defined hereinafter, the said machine having stator circuits, either of single phase, or having a plurality of phases, which when energized as required, create a rotating magnetic field system, which has as constituents, a main rotating field system whose speed is defined herein as the synchronous speed of the machine, and an auxiliary rotating field system whose speed is different from the synchronous speed as defined, and a power supply system to provide the power and control requirements of the said machine.

2. A rotor circuit having coils in which AC is induced, at the synchronous speed as defined in claim 1, by the auxiliary rotating field system, and means of rectification, to provide the DC excitation in accordance with claim 1, in an exciting circuit, which may consist of the same coils in which AC is induced, or a separate exciting coil, or a combination of both arrangements.

3. A three phase rotor circuit, in accordance with claim 1, using two diodes for rectification, in such a way that DC current flowing in one phase is divided between the other phases, to provide a resultant DC magneto motive force.

4. A rotor circuit, in accordance with claim 1, which has rectifying elements connected in bridge configuration, to provide DC magnetizing current.

5. An AC machine system, in accordance with claim 1, which can operate in any one of the generating or motoring modes or in both modes.

6. An AC machine system, in accordance with claim 1, which has induced torque, at both synchronous and non-synchronous speeds.

7. A power supply system, in accordance with claim 1, which has the necessary symmetrical components of opposite phase sequence, to create the main and auxiliary rotating field components.

8. An AC machine system, in accordance with claim 1, whose stator circuit has separate sections supplied with opposite phase sequence, or is unbalanced between phases, to create the main and auxiliary rotating field component systems.

9. An AC machine, in accordance with claim 1, whose stator phase coils are designed to provide significant amounts of spatial harmonics in its spatial field distribution, for the purpose of implementing the required auxiliary rotating field system.

10. A power supply system, in accordance with claim 1, having a static inverter system, whose output has a combination of frequencies, including those corresponding to the main and auxiliary rotating fields.

11. An AC machine system, in accordance with claim 1, which has separate stator circuits fed with AC, which differ in frequency or phase sequence or both, from a static inverter system, for the main and auxiliary rotating field systems.

12. An AC machine system, in accordance with claim 1, wherein, control is provided for torque, speed, position or field orientation, singly or in combination.

13. An AC machine system, in accordance with claim 1, fed by a static inverter system, in which the inverter system incorporates control of its switching, by speed or position signals from the rotor.

14. A machine system having magnetic poles on its rotor, which are DC excited according to claim 1, and whose stator circuit is energized in such a manner as to implement operation as a stepper motor.

* * * * *